No. 864,856. PATENTED SEPT. 3, 1907.
D. H. NORRIS.
METHOD OF SEPARATING THE METALLIC AND ROCKY CONSTITUENTS
OF ORES.
APPLICATION FILED NOV. 19, 1906.
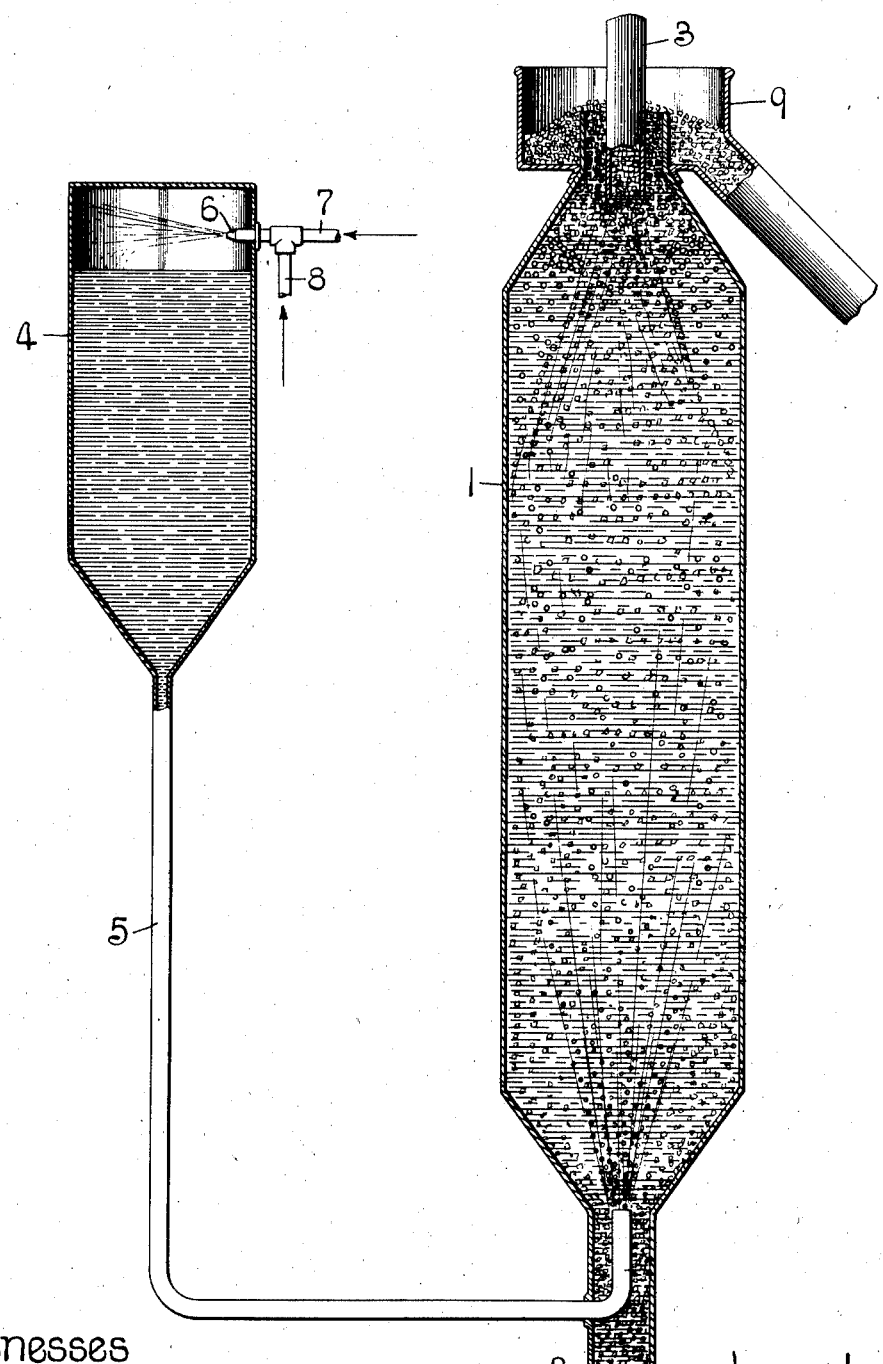
Witnesses
A. J. McCauley.
Wells L. Church.
Inventor:
Dudley H. Norris
by Newell Cornwall Attys.

UNITED STATES PATENT OFFICE.

DUDLEY H. NORRIS, OF NEW YORK, N. Y.

METHOD OF SEPARATING THE METALLIC AND ROCKY CONSTITUENTS OF ORES.

No. 864,856.          Specification of Letters Patent.          Patented Sept. 3, 1907.

Application filed November 19, 1906. Serial No. 344,041.

*To all whom it may concern:*

Be it known that I, DUDLEY H. NORRIS, a citizen of the United States, residing at New York, N. Y., have invented a certain new and useful Improvement in Methods of Separating the Metallic and Rocky Constituents of Ores, of which the following is a full, clear, and exact description, such as will enable others skilled in the art to which it appertains to make and use the same, reference being had to the accompanying drawings, forming part of this specification, in which the figure is a vertical sectional view of an apparatus for carrying out my method.

This invention relates to the concentration of metallic ores and has for its object to provide an improved process for separating the metallic particles contained in such ores from the barren or rocky constituents thereof.

Prior to my invention it had been proposed to separate the metallic particles of ores from the rocky particles by first mixing the pulverized ore with water and oil, in the presence of an acid, to form a flowing mixture and then creating a vacuum over the surface of the mixture. The oil was found to be attached to the metallic particles and not to the rocky particles and upon the formation of the vacuum over the surface of the flowing mixture bubbles of air were seen to form throughout the mixture and these would attach themselves to the particles of oil attached to the metallic particles and the result would be that these bubbles of air would rise to the surface and carry with them the particles of oil and also the metallic particles attached thereto. Arriving at the surface these would be collected and saved for further metallurgical treatment while the barren or rocky particles of the ore would sink to the bottom and be drawn off by a suitable discharge pipe.

It will be seen that the separation of the metallic particles from the rocky particles was due to the floating power of the bubbles of air thus formed throughout the mixture. These being released by the diminished pressure over the surface of the mixture and attaching themselves to the oil-bearing metallic particles, carries them to the surface. The efficiency of this process must depend upon the number of metallic particles thus floated to the surface and this must depend upon the amount of air contained in the water and which will form into bubbles throughout the mixture on diminution of the air pressure and thus float the oil-bearing metallic particles to the surface. At high altitudes this amount of air is very greatly diminished, owing to the fact that the pressure of the atmosphere is less at higher altitudes than at lower altitudes, the higher altitudes having the effect of a partial vacuum, and therefore the efficiency of this process at high altitudes is seriously impaired. And even at lower altitudes a rise in temperature or some other cause may easily reduce the amount of air in the water used and thus impair the efficiency of the process.

My improved method of separating the metallic particles from the rocky constituents of ores is not dependent for its successful operation upon the amount of air that by accident may be contained in the water that happens to be used for this method of concentration at any given altitude or under any given conditions. My process makes it possible to be sure that the water entering into the process shall contain the maximum amount of air possible under the conditions existing in every case, especially under varying conditions respecting altitude and temperature.

Briefly stated, my method consists in introducing a stream of water containing air in solution into the lower end of an open-ended receptacle into which is introduced a flowing mixture of pulverized ore mixed with oil and water, thereby exposing said mixture to the continuous action of infinitesimally small nascent bubbles of air. The diminution of the pressure on the air-charged water by coming into the open receptacle containing the flowing mixture, releases the bubbles of air contained in the water and these infinitesimally small nascent bubbles of air which are continuously forming rise and attach themselves to the metallic particles of the ore and carry them to the surface where they are collected and saved for further metallurgical treatment, as before described.

While I prefer to mix oil with the pulverized ore and water, I do not wish it to be understood that my method is limited to the use of oil, as the method can be practiced successfully without mixing oil with the pulverized ore and water.

I have herein shown one form of apparatus which may be used for carrying out my method and which consists of a tank 1, that is preferably conical-shaped, at its opposite ends, and having a discharge pipe 2 leading from its lower end. A pipe 3 projects into the upper end of said tank or receptacle and said pipe leads from a mixer (not shown) in which the pulverized ore, oil and water are thoroughly mixed together. A closed receptacle 4 which may be of any shape is provided for receiving air and water, and a pipe 5 leads from the lower contracted end of said receptacle to the lower end of the tank 1. Water and air under pressure may be introduced into the receptacle 4 in various ways but I prefer to inject a spray into said receptacle, a nozzle 6 to which an air pipe 7 and water pipe 8 lead, being provided for this purpose. The upper end of the tank 1 is open so that the stream of water charged with air which enters the lower end of said tank will cause infinitesimally small nascent bubbles of air to form continuously and rise upwardly through the mixture contained in said tank and thus carry to the surface of said mixture the metallic particles of the ore, the oil rising to the top of the mixture as indicated in the drawing, and flowing over the upper edge of the tank 1 into a cup 9 from which a discharge conduit leads, the water which was introduced through the tube 5 as well as the water which forms a part of the mixture, passing out through the discharge tube 2 at the lower end of the tank with the rocky particles of the ore.

I have herein shown one form of apparatus which may be used for practicing my method but it will, of course, be understood that various other forms of apparatus could be used for carrying out my method.

Having thus described my invention, what I claim as new and desire to secure by Letters Patent is:

1. The method of separating the metallic and rocky particles of ore, which consists in introducing a stream of water containing air in solution into a mixture composed of crushed ore, oil and water to cause bubbles of air to form in said mixture and rise to the surface thereof to carry off the metallic particles of the ore; substantially as described.

2. The method of separating the metallic and rocky particles of ore, which consists in introducing a mixture composed of crushed ore, oil and water into the upper end of a receptacle, introducing a stream of water containing air in solution into the lower end of said receptacle to cause bubbles of air to form and pass upwardly through the mixture to carry the metallic particles of ore to the surface thereof, conveying away the metallic particles of ore which collect on the surface of the mixture, and carrying away the water and rocky particles of ore from the lower end of said receptacle; substantially as described.

3. The method of separating the metallic and rocky particles of ore, which consists in introducing a continuous stream of water containing air in solution into a mixture composed of crushed ore and water to cause nascent bubbles of air to form continuously in said mixture and rise to the surface thereof to carry off the metallic particles of the ore; substantially as described.

4. The method of separating the metallic and rocky particles of ore, which consists in introducing a flowing mixture composed of crushed ore and water into the upper end of a receptacle, introducing a continuous stream of water containing air in solution into the lower end of said receptacle to cause infinitesimally small nascent bubbles of air to form continuously and pass upwardly through the mixture to carry the metallic particles of ore to the surface thereof, conveying away the metallic particles of ore which collect on the surface of the mixture, and conveying away the water and rocky particles of ore from the lower end of said receptacle; substantially as described.

5. The method of separating the metallic and rocky particles of ore, which consists in introducing a continuously flowing mixture of crushed ore and water into a receptacle which has its upper end open, introducing a continuously flowing stream of water containing air in solution into the lower end of said receptacle to cause infinitesimally small nascent bubbles of air to form continuously and pass upwardly through the mixture and thus carry the metallic particles of the ore to the upper end of the receptacle over the edge of which they overflow and permitting the waste water and rocky particles of the ore to pass out of the lower end of said receptacle; substantially as described.

In testimony whereof I hereunto affix my signature in the presence of two witnesses, this eighth day of November, 1906.

DUDLEY H. NORRIS.

Witnesses:
WELLS L. CHURCH,
GEORGE BAKEWELL.